US012695176B2

(12) United States Patent
Shi

(10) Patent No.: US 12,695,176 B2
(45) Date of Patent: Jul. 28, 2026

(54) ANTENNA STRUCTURE AND WEARABLE ELECTRONIC DEVICE

(71) Applicant: GUANGDONG COROS SPORTS TECHNOLOGY CO., LTD, Dongguan City (CN)

(72) Inventor: Xianwei Shi, Dongguan City (CN)

(73) Assignee: GUANGDONG COROS SPORTS TECHNOLOGY CO., LTD, Dongguan City (CN)

( * ) Notice: Subject to any disclaimer, the term of this patent is extended or adjusted under 35 U.S.C. 154(b) by 19 days.

(21) Appl. No.: 18/886,049

(22) Filed: Sep. 16, 2024

(65) Prior Publication Data

US 2025/0112361 A1 Apr. 3, 2025

(30) Foreign Application Priority Data

Sep. 28, 2023 (CN) ........................ 202311281091.6

(51) Int. Cl.
*H01Q 1/27* (2006.01)
*H01Q 5/20* (2015.01)

(52) U.S. Cl.
CPC ............... *H01Q 1/273* (2013.01); *H01Q 5/20* (2015.01)

(58) Field of Classification Search
CPC ........ H01Q 1/273; H01Q 1/3233; H01Q 5/20; H01Q 5/328; H01Q 5/371; H01Q 7/00; H01Q 9/0421; H01Q 9/0428; H01Q 9/0442; H01Q 9/0464
See application file for complete search history.

(56) References Cited

U.S. PATENT DOCUMENTS

| | | | | |
|---|---|---|---|---|
| 5,142,290 | A * | 8/1992 | DuFort .................... | H01Q 3/22 342/372 |
| 8,098,187 | B1 * | 1/2012 | Lynch .................... | H01Q 25/00 343/911 L |
| 10,483,655 | B2 * | 11/2019 | Vouvakis ............. | H01Q 21/064 |
| 2010/0097275 | A1 | 4/2010 | Parsche et al. | |
| 2015/0318617 | A1 * | 11/2015 | Wu ...................... | H01Q 9/0428 343/843 |

(Continued)

FOREIGN PATENT DOCUMENTS

| | | |
|---|---|---|
| CN | 104979634 A | 10/2015 |
| CN | 107425292 A | 12/2017 |

(Continued)

*Primary Examiner* — Thien M Le
(74) *Attorney, Agent, or Firm* — The Webb Law Firm

(57) ABSTRACT

An antenna structure includes a first arc-shaped radiator and a frequency modulation component. A first end of the first arc-shaped radiator is configured to be electrically connected with a position determination component, a second end of the first arc-shaped radiator is configured to be grounded, and the first arc-shaped radiator is configured to receive a first frequency signal and a second frequency signal. The frequency modulation component is electrically connected with the first arc-shaped radiator, and the frequency modulation component is configured to adjust a frequency of the first frequency signal to a first target frequency and a frequency of the second frequency signal to a second target frequency. The first frequency signal includes a first satellite positioning signal, and the second frequency signal includes a second satellite positioning signal.

15 Claims, 2 Drawing Sheets

(56) References Cited

U.S. PATENT DOCUMENTS

| | | | | |
|---|---|---|---|---|
| 2017/0033461 | A1* | 2/2017 | Mohajer Jasebi | H01Q 1/2291 |
| 2019/0067816 | A1* | 2/2019 | Quinlan | H01Q 5/371 |
| 2019/0109367 | A1 | 4/2019 | Tseng et al. | |
| 2020/0103833 | A1 | 4/2020 | Kita et al. | |
| 2021/0091466 | A1* | 3/2021 | Wu | H01Q 5/307 |
| 2021/0167504 | A1* | 6/2021 | Yu | H01Q 9/045 |
| 2021/0344106 | A1 | 11/2021 | Sung et al. | |
| 2022/0286148 | A1* | 9/2022 | Song | H01Q 1/243 |
| 2022/0329270 | A1* | 10/2022 | Pehlke | H01Q 5/42 |
| 2022/0336953 | A1* | 10/2022 | Yang | H01Q 1/243 |

FOREIGN PATENT DOCUMENTS

| | | | | |
|---|---|---|---|---|
| CN | 110994131 | A | 4/2020 | |
| CN | 212302231 | U | 1/2021 | |
| CN | 113067121 | A | 7/2021 | |
| CN | 114846696 | A | 8/2022 | |
| CN | 217934210 | U | 11/2022 | |
| CN | 116137378 | A | 5/2023 | |
| CN | 219498166 | U | 8/2023 | |
| WO | 2021196136 | A1 | 7/2021 | |
| WO | WO-2022-168119 | * | 10/2022 | H01Q 9/42 |
| WO | 2023140589 | A1 | 7/2023 | |
| WO | 2023174274 | A1 | 9/2023 | |

* cited by examiner

ANTENNA STRUCTURE AND WEARABLE ELECTRONIC DEVICE

CROSS-REFERENCE TO RELATED APPLICATION

This application claims priority to Chinese Patent Application No. 202311281091.6 filed Sep. 28, 2023, the disclosure of which is hereby incorporated by reference in its entirety.

BACKGROUND

Technical Field

The present application relates to the field of antenna technology, more particularly to an antenna structure and a wearable electronic device.

Technical Description

With the rapid development of wireless communication terminal technology, wearable electronic devices have attracted people's attention. A typical wearable electronic devices is advantageous in small sizes and being easy to carry, which, however, also brings great troubles to the antenna design in such product. Due to the small size and complex internal environment of the wearable electronic device, the design space of the antenna is insufficient.

SUMMARY

Non-limiting embodiments of the present application provides an antenna structure and a wearable electronic device, which can solve the problem that the small space volume of wearable electronic devices leads to insufficient design space for the antenna.

In a first non-limiting aspect, non-limiting embodiments of the present application provide an antenna structure, comprising: a first arc-shaped radiator and a frequency modulation component.

A first end of the first arc-shaped radiator is configured to be electrically connected with a position determination component, a second end of the first arc-shaped radiator is configured to be grounded, and the first arc-shaped radiator is configured to receive a first frequency signal and a second frequency signal.

The frequency modulation component is electrically connected with the first arc-shaped radiator, and the frequency modulation component is configured to adjust a frequency of the first frequency signal to a first target frequency and a frequency of the second frequency signal to a second target frequency.

The first frequency signal comprises a first satellite positioning signal, and the second frequency signal comprises a second satellite positioning signal.

In a second non-limiting aspect, non-limiting embodiments of the present application provides a wearable electronic device, comprising:

- a casing,
- the antenna structure according to implementation manner of the first aspect, and
- a position determination component, which is arranged inside the casing, and configured to: receive the first satellite positioning signal and the second satellite positioning signal from the antenna structure, and determine a current geographic location based on the first satellite positioning signal and the second satellite positioning signal.

BRIEF DESCRIPTION OF THE DRAWINGS

In order to more clearly illustrate the technical solutions in the non-limiting embodiments of the present application, the drawings required for use in the embodiments or prior art descriptions will be briefly introduced below. Obviously, the drawings described below are only some non-limiting embodiments or aspects of the present application. For ordinary technicians in this field, other drawings can be obtained based on these drawings without creative labor.

DETAILED DESCRIPTION

Figure 1:
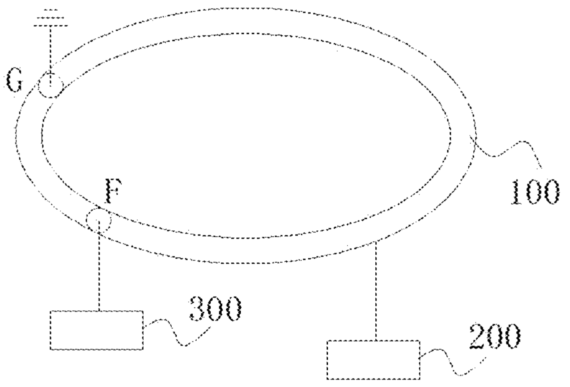
FIG. 1 is a structural schematic diagram of an antenna structure provided by a non-limiting embodiment of the present application.

In the following description, for the purpose of explanation rather than limitation, specific details such as specific system structures and technologies are proposed so as to provide a thorough understanding of the non-limiting embodiments of the present application. However, it should be clear to those skilled in the art that the present application can also be implemented in other embodiments without these specific details. In other cases, detailed descriptions of well-known systems, devices, circuits, and methods are omitted to avoid unnecessary details that hinder the description of the present application.

It should be understood that when used in the specification and the appended claims of the present application, the term "comprising" indicates the presence of the described features, wholes, steps, operations, elements, and/or components, but does not exclude the presence or addition of one or more other features, wholes, steps, operations, elements, components, and/or their combinations.

It should also be understood that the term "and/or" used in the specification and the appended claims of the present application refers to any combination of one or more of the associated listed items and all possible combinations, and includes these combinations.

As used in the specification and the appended claims of the present application, the term "if" can be interpreted as "when . . . " or "once" or "in response to determination" or "in response to detection" according to the context. Similarly, the phrase "if determined" or "if [described condition or event] is detected" can be interpreted as meaning "once determined" or "in response to determining" or "once [described condition or event] is detected" or "in response to detecting [described condition or event]", depending on the context.

In addition, in the description of the specification and the attached claims of the present application, the terms "first", "second", "third", etc. are only used to distinguish the description and cannot be understood as indicating or implying relative importance.

The reference to "one embodiment" or "some embodiments" described in the specification of the present application means that one or more embodiments of the present application comprise specific features, structures, or characteristics described in conjunction with the embodiment. Therefore, the sentences "in one embodiment", "in some embodiments", "in some other embodiments", "in still some other embodiments", etc. that appear in different places in this specification do not necessarily refer to the same embodiment, but mean "one or more but not all embodiments", unless otherwise specifically emphasized in other ways. The terms "comprise", "include", "have" and their variations all mean "comprising but not limited to", unless otherwise specifically emphasized in other ways.

Wearable electronic devices generally require built-in antennas so that the wearable electronic devices have positioning functions. Current wearable electronic devices have multiple built-in antennas, so that the wearable electronic devices can receive multiple satellite positioning signals of different frequencies. However, the internal spaces of wearable electronic devices are small, and it is difficult to arrange multiple antennas.

Based on the above problems, non-limiting embodiments of the present application provide an antenna structure. As shown in FIG. 1, the antenna structure comprises a first arc-shaped radiator 100 and a frequency modulation component 200. A first end F of the first arc-shaped radiator 100 is configured to be electrically connected with a position determination component 300, a second end G of the first arc-shaped radiator 100 is configured to be grounded, and the first arc-shaped radiator 100 is configured to receive a first frequency signal and a second frequency signal. The frequency modulation component 200 is electrically connected with the first arc-shaped radiator 100, and the frequency modulation component 200 is configured to adjust a frequency of the first frequency signal to a first target frequency and a frequency of the second frequency signal to a second target frequency. The first frequency signal comprises a first satellite positioning signal, and the second frequency signal comprises a second satellite positioning signal.

Specifically, the first end F of the first arc-shaped radiator 100 is configured to be electrically connected with the position determination component 300, and the second end G of the first arc-shaped radiator 100 is configured to be grounded, that is, the first end F of the first arc-shaped radiator 100 is a feed point, and the second end G of the first arc-shaped radiator 100 is a grounding point. When the first arc-shaped radiator 100 is not connected to the frequency modulation component 200, the first arc-shaped radiator 100 can receive a first frequency signal and a second frequency signal, and the frequency of the second frequency signal is an integer multiple of the frequency of the first frequency signal.

The frequency modulation component 200 is electrically connected with the first arc-shaped radiator 100, the frequency modulation component 200 can adjust the frequency of the signal received by the first arc-shaped radiator 100, such that the frequency of the first frequency signal is adjusted to the first target frequency, and the frequency of the second frequency signal is adjusted to the second target frequency. The first frequency signal comprises a first satellite positioning signal, and the second frequency signal comprises a second satellite positioning signal. Finally, the antenna structure can receive the first satellite positioning signal of the first target frequency and the second satellite positioning signal of the second target frequency. Compared with using two radiators to receive two satellite positioning signals, the antenna structure provided in the non-limiting embodiments of the present application only uses the first arc-shaped radiator 100 to receive both the first satellite positioning signal and the second satellite positioning signal, which can reduce the length of the radiator, reduce the occupied space of the antenna structure, and improve the flexibility in designing the antenna structure in the wearable electronic device.

In some non-limiting embodiments, as shown in FIG. 2, the frequency modulation component 200 is connected at a first preset position on the first arc-shaped radiator 100. The first preset position comprises one or more of the following positions: an intersection of a strong current area when the first arc-shaped radiator 100 receives the first frequency signal and a weak current area when the first arc-shaped radiator 100 receives the second frequency signal on the first arc-shaped radiator 100 (area A and area C in FIG. 2); an intersection of a weak current area when the first arc-shaped radiator 100 receives the first frequency signal and a strong current area when the first arc-shaped radiator 100 receives the second frequency signal on the first arc-shaped radiator 100 (area B in FIG. 2); and an intersection of the weak current area when the first arc-shaped radiator receives the first frequency signal and the weak current area when the first arc-shaped radiator receives the second frequency signal on the first arc-shaped radiator (not shown in FIG. 2).

Figure 2A:
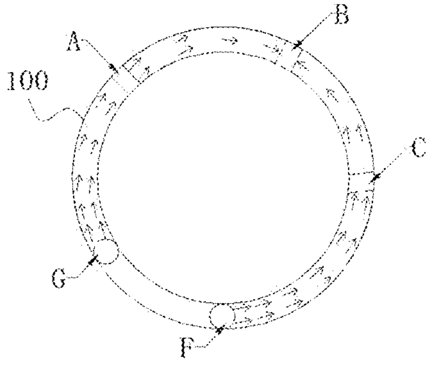
FIG. 2A and FIG. 2B are current distribution diagrams when a first arc-shaped radiator provided by a non-limiting embodiment of the present application receives a first frequency signal and a second frequency signal.

Specifically, FIG. 2A is a schematic diagram of a current distribution in the first arc-shaped radiator 100 when the first arc-shaped radiator 100 receives the first frequency signal, in which, a reverse direction of the arrows represents a direction of the current, and a density of the arrows represents a strength of the current. The denser the arrows, the larger the current, and the sparser the arrows, the smaller the current. When the first arc-shaped radiator 100 receives the first frequency signal, a current will be generated on the first arc-shaped radiator 100; in such condition, an area of the first arc-shaped radiator 100 with a relatively strong current is referred to as a strong current area, that is, the area with relatively dense arrows in FIG. 2A, and an area of the first arc-shaped radiator 100 with a relatively weak current is referred to as a weak current area, that is, the area with relatively sparse arrows in FIG. 2A. If the frequency modulation component 200 is connected to the strong current area when the first arc-shaped radiator 100 receives the first frequency signal, the frequency modulation component 200 has a relatively little effect on a resonant frequency of the first arc-shaped radiator 100, that is, the frequency modulation component 200 will cause a relatively small change in the frequency of the first frequency signal. If the frequency modulation component 200 is connected to the weak current area when the first arc-shaped radiator 100 receives the first frequency signal, the frequency modulation component 200 has a relatively great effect on a resonant frequency of the first arc-shaped radiator 100, that is, the frequency modulation component 200 will cause a relatively significant change in the frequency of the first frequency signal.

Figure 2B:
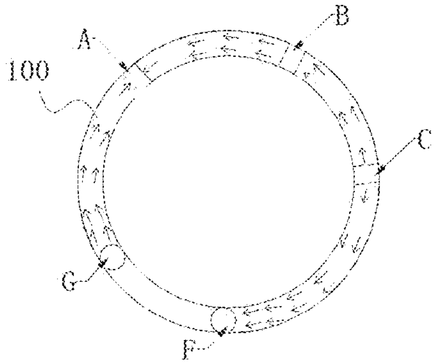

Specifically, FIG. 2B is a schematic diagram of a current distribution in the first arc-shaped radiator 100 when the first arc-shaped radiator 100 receives the second frequency signal, in which, a reverse direction of the arrows represents a direction of the current, and a density of the arrows represents a strength of the current. The denser the arrows, the larger the current, and the sparser the arrows, the smaller the current. When the first arc-shaped radiator 100 receives the second frequency signal, a current will be generated on the first arc-shaped radiator 100; in such condition, an area of the first arc-shaped radiator 100 with a relatively strong current is referred to as a strong current area, that is, the area with relatively dense arrows in FIG. 2B, and an area of the first arc-shaped radiator 100 with a relatively weak current is referred to as a weak current area, that is, the area with relatively sparse arrows in FIG. 2B. If the frequency modulation component 200 is connected to the strong current area when the first arc-shaped radiator 100 receives the second frequency signal, the frequency modulation component 200 has a relatively little effect on a resonant frequency of the first arc-shaped radiator 100, that is, the frequency modulation component 200 will cause a relatively small change in the frequency of the second frequency signal. If the frequency modulation component 200 is connected to the weak current area when the first arc-shaped radiator 100 receives the second frequency signal, the frequency modulation component 200 has a relatively great effect on a resonant frequency of the first arc-shaped radiator 100, that is, the frequency modulation component 200 will cause a relatively significant change in the frequency of the second frequency signal.

If the frequency modulation component 200 is connected to the intersection of the strong current area when the first arc-shaped radiator 100 receives the first frequency signal and the weak current area when the first arc-shaped radiator 100 receives the second frequency signal on the first arc-shaped radiator 100 (area A or area C on the first arc-shaped radiator 100), the frequency modulation component 200 can make the frequency of the first frequency signal change slightly and the frequency of the second frequency signal change significantly.

If the frequency modulation component 200 is connected to the intersection of the weak current area when the first arc-shaped radiator 100 receives the first frequency signal and the strong current area when the first arc-shaped radiator 100 receives the second frequency signal on the first arc-shaped radiator 100 (area B on the first arc-shaped radiator 100), the frequency modulation component 200 can make the frequency of the first frequency signal change significantly and the frequency of the second frequency signal change slightly.

By connecting the frequency modulation component 200 to the first preset position on the first arc-shaped radiator 100, the frequencies of the first frequency signal and the second frequency signal can be adjusted, such that the frequency of the first frequency signal is adjusted to the first target frequency, and the frequency of the second frequency signal is adjusted to the second target frequency, and the antenna structure can finally receive the first satellite positioning signal of the first target frequency and the second satellite positioning signal of the second target frequency. Compared with the conventional method where two radiators are used to receive two satellite positioning signals, the antenna structure provided in the non-limiting embodiments of the present application uses only one first arc-shaped radiator 100 to receive the first satellite positioning signal of the first target frequency and the second satellite positioning signal of the second target frequency, which can reduce the length of the radiator, facilitate the miniaturization design of the antenna structure, improve the flexibility in designing the antenna structure in the wearable electronic device, and reduce the design difficulty of the antenna structure.

It should be noted that only part of the first preset positions are shown in FIG. 2, the first arc-shaped radiator 100 receives the first frequency signal and the second frequency signal with different frequencies, and the first arc-shaped radiator 100 comprises different first preset positions.

In some non-limiting embodiments, the frequency modulation component 200 comprises a capacitor and/or an inductor. When the frequency modulation component 200 comprises the capacitor, a first end of the capacitor is connected to the first preset position on the first arc-shaped radiator 100, and a second end of the capacitor is configured to be grounded; and when the frequency modulation component 200 comprises the inductor, a first end of the inductor is connected to the first preset position on the first arc-shaped radiator 100, and a second end of the inductor is configured to be grounded.

Specifically, when a capacitor is connected in parallel to the first arc-shaped radiator 100, the frequencies of the signals received by the first arc-shaped radiator 100 will be reduced, that is, the frequencies of the first frequency signal and the second frequency signal received by the first arc-shaped radiator 100 will be reduced. When an inductor is connected in parallel to the first arc-shaped radiator 100, the frequencies of the signals received by the first arc-shaped radiator 100 will be increased, that is, the frequencies of the first frequency signal and the second frequency signal received by the first arc-shaped radiator 100 will be increased.

When the first end of the capacitor is connected to the intersection of the strong current area when the first arc-shaped radiator 100 receives the first frequency signal and the weak current area when the first arc-shaped radiator 100 receives the second frequency signal on the first arc-shaped radiator 100, that is, the first end of the capacitor is connected to the area A or the area C on the first arc-shaped radiator 100, and the second end of the capacitor is grounded, the frequency of the first frequency signal is reduced to a relatively small extent, and the frequency of the second frequency signal is reduced to a relatively large extent. When the first end of the inductor is connected to the intersection of the strong current area when the first arc-shaped radiator 100 receives the first frequency signal and the weak current area when the first arc-shaped radiator 100 receives the second frequency signal on the first arc-shaped radiator 100, that is, the first end of the inductor is connected to the area A or the area C on the first arc-shaped radiator 100, and the second end of the inductor is grounded, the frequency of the first frequency signal is increased to a relatively small extent, and the frequency of the second frequency signal is increased to a relatively large extent.

When the first end of the capacitor is connected to the intersection of the weak current area when the first arc-shaped radiator 100 receives the first frequency signal and the strong current area when the first arc-shaped radiator 100 receives the second frequency signal on the first arc-shaped radiator 100, that is, the first end of the capacitor is connected to the area B on the first arc-shaped radiator 100, and the second end of the capacitor is grounded, the frequency of the first frequency signal is reduced to a relatively large extent, and the frequency of the second frequency signal is reduced to a relatively small extent. When the first end of the inductor is connected to the intersection of the weak current area when the first arc-shaped radiator 100 receives the first frequency signal and the strong current area when the first arc-shaped radiator 100 receives the second frequency signal on the first arc-shaped radiator 100, that is, the first end of the inductor is connected to the area B on the first arc-shaped radiator 100, and the second end of the inductor is grounded, the frequency of the first frequency signal is increased to a relatively large extend, and the frequency of the second frequency signal is increased to a relatively small extent.

By connecting a capacitor or an inductor in parallel at the first preset position on the first arc-shaped radiator 100, the frequency of the first frequency signal and the frequency of the second frequency signal can be adjusted, and finally the first arc-shaped radiator 100 can receive the first satellite positioning signal of the first target frequency and the second satellite positioning signal of the second target frequency.

Figure 3A:
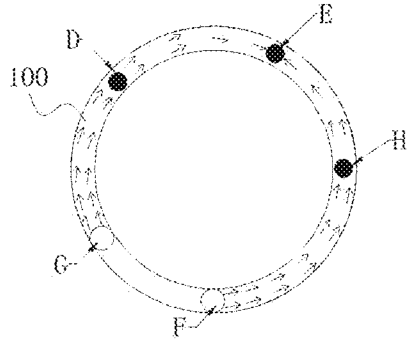
FIG. 3A and FIG. 3B are current distribution diagrams when a first arc-shaped radiator provided by a non-limiting embodiment of the present application receives a first frequency signal and a second frequency signal.
Figure 3B:
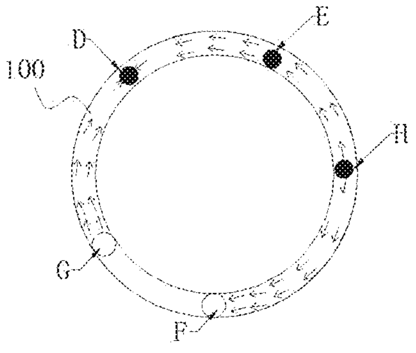

In some non-limiting embodiments, as shown in FIG. 3, the frequency modulation component 200 is connected to a second preset position of the first arc-shaped radiator 100. The second preset position comprises a midpoint position of the first arc-shaped radiator 100 (a position of point E in FIG. 3), and/or, the second preset position comprises a position of at least one point of two trisection points of the first arc-shaped radiator 100 (a position at point D and a position at point H in FIG. 3).

Specifically, the midpoint position A of the first arc-shaped radiator 100 is the intersection of the weak current area when the first arc-shaped radiator 100 receives the first frequency signal and the strong current area when the first arc-shaped radiator 100 receives the second frequency signal on the first arc-shaped radiator 100. When the frequency modulation component 200 is connected to the midpoint position of the first arc-shaped radiator 100, the frequency modulation component 200 can adjust the frequency of the first frequency signal to a relatively large extent and adjust the frequency of the second frequency signal to a relatively small extent.

Two trisection points are provided on the first arc-shaped radiator 100. The two trisection points (point D and point H in FIG. 3) are the intersection of the strong current area when the first arc-shaped radiator 100 receives the first frequency signal and the weak current area when the first arc-shaped radiator 100 receives the second frequency signal on the first arc-shaped radiator 100. When the frequency modulation component 200 is connected to a trisection point, the frequency modulation component 200 can adjust the frequency of the first frequency signal to a relatively small extent and adjust the frequency of the second frequency signal to a relatively large extent.

Thus, by connecting the frequency modulation component 200 to the midpoint position and/or the trisection point position of the first arc-shaped radiator 100, the frequency of the first frequency signal and the frequency of the second frequency signal received by the first arc-shaped radiator 100 can be adjusted, such that the frequency of the first frequency signal is adjusted to the first target frequency, the frequency of the second frequency signal is adjusted to the second target frequency, and the antenna structure can finally receive the first satellite positioning signal of the first target frequency and the second satellite positioning signal of the second target frequency. Compared with the conventional method where two radiators are used to receive two satellite positioning signals, the antenna structure provided in the non-limiting embodiments of the present application uses only one first arc-shaped radiator 100 to receive the first satellite positioning signal of the first target frequency and the second satellite positioning signal of the second target frequency, which can reduce the length of the radiator, facilitate the miniaturization design of the antenna structure, improve the flexibility in designing the antenna structure in the wearable electronic device, and reduce the design difficulty of the antenna structure.

Exemplarily, the first satellite positioning signal is an L1 frequency band signal, and the second satellite positioning signal is an L5 frequency band signal.

Figure 4A:
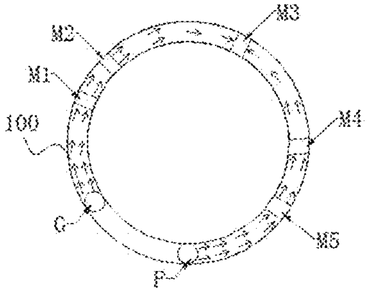
FIG. 4A, 4B, and FIG. 4C are current distribution diagrams when a first arc-shaped radiator provided by a non-limiting embodiment of the present application receives a first frequency signal, a second frequency signal, and a third frequency signal.
Figure 4B:
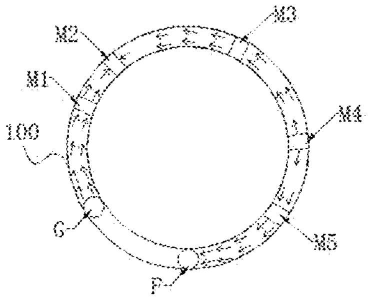

In some non-limiting embodiments, as shown in FIG. 4, the first arc-shaped radiator 100 is further configured to receive a third frequency signal, and the frequency modulation component 200 is further configured to adjust the frequency of the third frequency signal to a third target frequency.

Specifically, when the first arc-shaped radiator 100 is not connected to the frequency modulation component 200, the first arc-shaped radiator 100 can receive the third frequency signal, in addition to the first frequency signal and the second frequency signal. The frequency of the third frequency signal is an integer multiple of the frequency of the first frequency signal, and the frequency of the third frequency signal is different from the frequency of the second frequency signal.

Figure 4C:
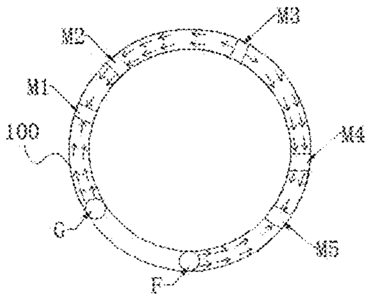

Specifically, FIG. 4C is a schematic diagram of a current distribution in the first arc-shaped radiator 100 when the first arc-shaped radiator 100 receives the third frequency signal, in which, a reverse direction of the arrows represents a direction of the current, and a density of the arrows represents a strength of the current. The denser the arrows, the larger the current, and the sparser the arrows, the smaller the current. When the first arc-shaped radiator 100 receives the third frequency signal, a current will be generated on the first arc-shaped radiator 100; in such condition, an area of the first arc-shaped radiator 100 with a relatively strong current is referred to as a strong current area, that is, the area with relatively dense arrows in FIG. 4C, and an area of the first arc-shaped radiator 100 with a relatively weak current is referred to as a weak current area, that is, the area with relatively sparse arrows in FIG. 4C. If the frequency modulation component 200 is connected to the strong current area when the first arc-shaped radiator 100 receives the third frequency signal, the frequency modulation component 200 has a relatively little effect on a resonant frequency of the first arc-shaped radiator 100, that is, the frequency modulation component 200 will cause a relatively small change in the frequency of the third frequency signal. If the frequency modulation component 200 is connected to the weak current area when the first arc-shaped radiator 100 receives the third frequency signal, the frequency modulation component 200 has a relatively great effect on a resonant frequency of the first arc-shaped radiator 100, that is, the frequency modulation component 200 will cause a relatively significant change in the frequency of the third frequency signal.

The frequency modulation component 200 is electrically connected with the first arc-shaped radiator 100, and the frequency of the signal received by the first arc-shaped radiator 100 can be adjusted by the frequency modulation component 20, such that the frequency of the first frequency signal is adjusted to the first target frequency, the frequency of the second frequency signal is adjusted to the second target frequency, and the frequency of the third frequency signal is adjusted to the third target frequency. The first frequency signal comprises the first satellite positioning signal, and the second frequency signal comprises the second satellite positioning signal. Finally, the antenna structure can receive the first satellite positioning signal of the first target frequency, the second satellite positioning signal of the second target frequency, and the third frequency signal.

Compared with using three radiators to receive three frequency signals, the antenna structure provided in the non-limiting embodiments of the present application can receive the first satellite positioning signal, the second satellite positioning signal, and the third frequency signal using only the first arc-shaped radiator 100, which can reduce the length of the radiator, reduce the space occupied by the antenna structure, and improve the flexibility in designing the antenna structure in the wearable electronic device.

In some non-limiting embodiments, as shown in FIG. 4, the frequency modulation component 200 is connected to a third preset position on the first arc-shaped radiator 100. The third preset position comprises one or more of the following positions: an intersection of a strong current area when the first arc-shaped radiator 100 receives the first frequency signal, a strong current area when the first arc-shaped radiator 100 receives the second frequency signal, and a weak current area when the first arc-shaped radiator 100 receives the third frequency signal on the first arc-shaped radiator 100 (area M1 and area M5 in FIG. 4); an intersection of the strong current area when the first arc-shaped radiator 100 receives the first frequency signal, a weak current area when the first arc-shaped radiator 100 receives the second frequency signal, and a strong current area when the first arc-shaped radiator 100 receives the third frequency signal on the first arc-shaped radiator 100 (not shown in FIG. 4); an intersection of the strong current area when the first arc-shaped radiator 100 receives the first frequency signal, the weak current area when the first arc-shaped radiator 100 receives the second frequency signal, and the weak current area when the first arc-shaped radiator 100 receives the third frequency signal on the first arc-shaped radiator 100 (not shown in FIG. 4); an intersection of a weak current area when the first arc-shaped radiator 100 receives the first frequency signal, the strong current area when the first arc-shaped radiator 100 receives the second frequency signal, and the strong current area when the first arc-shaped radiator 100 receives the third frequency signal on the first arc-shaped radiator 100 (not shown in FIG. 4); an intersection of the weak current area when the first arc-shaped radiator 100 receives the first frequency signal, the strong current area when the first arc-shaped radiator 100 receives the second frequency signal, and the weak current area when the first arc-shaped radiator 100 receives the third frequency signal on the first arc-shaped radiator 100 (area M3 in FIG. 4); an intersection of the weak current area when the first arc-shaped radiator 100 receives the first frequency signal, the weak current area when the first arc-shaped radiator 100 receives the second frequency signal, and the strong current area when the first arc-shaped radiator 100 receives the third frequency signal on the first arc-shaped radiator 100 (area M2 and area M4 in FIG. 4); and an intersection of the weak current area when the first arc-shaped radiator 100 receives the first frequency signal, the weak current area when the first arc-shaped radiator 100 receives the second frequency signal, and the weak current area when the first arc-shaped radiator 100 receives the third frequency signal on the first arc-shaped radiator 100 (not shown in FIG. 4).

Specifically, when the first arc-shaped radiator 100 receives the first frequency signal, a current will be generated on the first arc-shaped radiator 100; in such condition, an area of the first arc-shaped radiator 100 with a relatively strong current is referred to as a strong current area, and an area of the first arc-shaped radiator 100 with a relatively weak current is referred to as a weak current area. If the frequency modulation component 200 is connected to the strong current area when the first arc-shaped radiator 100 receives the first frequency signal, the frequency modulation component 200 has a relatively little effect on a resonant frequency of the first arc-shaped radiator 100, that is, the frequency modulation component 200 will cause a relatively small change in the frequency of the first frequency signal. If the frequency modulation component 200 is connected to the weak current area when the first arc-shaped radiator 100 receives the first frequency signal, the frequency modulation component 200 has a relatively great effect on a resonant frequency of the first arc-shaped radiator 100, that is, the frequency modulation component 200 will cause a relatively significant change in the frequency of the first frequency signal.

When the first arc-shaped radiator 100 receives the second frequency signal, a current will be generated on the first arc-shaped radiator 100; in such condition, an area of the first arc-shaped radiator 100 with a relatively strong current is referred to as a strong current area, and an area of the first arc-shaped radiator 100 with a relatively weak current is referred to as a weak current area. If the frequency modulation component 200 is connected to the strong current area when the first arc-shaped radiator 100 receives the second frequency signal, the frequency modulation component 200 has a relatively little effect on a resonant frequency of the first arc-shaped radiator 100, that is, the frequency modulation component 200 will cause a relatively small change in the frequency of the second frequency signal. If the frequency modulation component 200 is connected to the weak current area when the first arc-shaped radiator 100 receives the second frequency signal, the frequency modulation component 200 has a relatively great effect on a resonant frequency of the first arc-shaped radiator 100, that is, the frequency modulation component 200 will cause a relatively significant change in the frequency of the second frequency signal.

When the first arc-shaped radiator 100 receives the third frequency signal, a current will be generated on the first arc-shaped radiator 100; in such condition, an area of the first arc-shaped radiator 100 with a relatively strong current is referred to as a strong current area, and an area of the first arc-shaped radiator 100 with a relatively weak current is referred to as a weak current area. If the frequency modulation component 200 is connected to the strong current area when the first arc-shaped radiator 100 receives the third frequency signal, the frequency modulation component 200 has a relatively little effect on a resonant frequency of the first arc-shaped radiator 100, that is, the frequency modulation component 200 will cause a relatively small change in the frequency of the third frequency signal. If the frequency modulation component 200 is connected to the weak current area when the first arc-shaped radiator 100 receives the third frequency signal, the frequency modulation component 200 has a relatively great effect on a resonant frequency of the first arc-shaped radiator 100, that is, the frequency modulation component 200 will cause a relatively significant change in the frequency of the third frequency signal.

If the frequency modulation component 200 is connected to intersection of the strong current area when the first arc-shaped radiator 100 receives the first frequency signal, the strong current area when the first arc-shaped radiator 100 receives the second frequency signal, and the weak current area when the first arc-shaped radiator 100 receives the third frequency signal on the first arc-shaped radiator 100 (area M1 and area M5 in FIG. 4), the frequency modulation component 200 can make the frequency of the first frequency signal change slightly, the frequency of the second frequency signal change slightly, and the frequency of the third frequency signal change significantly.

If the frequency modulation component 200 is connected to the intersection of the strong current area when the first arc-shaped radiator 100 receives the first frequency signal, the weak current area when the first arc-shaped radiator 100 receives the second frequency signal, and a strong current area when the first arc-shaped radiator 100 receives the third frequency signal on the first arc-shaped radiator 100 (not shown in FIG. 4), the frequency modulation component 200 can make the frequency of the first frequency signal change slightly, the frequency of the second frequency signal change significantly, and the frequency of the third frequency signal change slightly.

If the frequency modulation component 200 is connected to the intersection of the strong current area when the first arc-shaped radiator 100 receives the first frequency signal, the weak current area when the first arc-shaped radiator 100 receives the second frequency signal, and the weak current area when the first arc-shaped radiator 100 receives the third frequency signal on the first arc-shaped radiator 100 (not shown in FIG. 4), the frequency modulation component 200 can make the frequency of the first frequency signal change slightly, the frequency of the second frequency signal change significantly, and the frequency of the third frequency signal change significantly.

If the frequency modulation component 200 is connected to the intersection of the weak current area when the first arc-shaped radiator 100 receives the first frequency signal, the strong current area when the first arc-shaped radiator 100 receives the second frequency signal, and the strong current area when the first arc-shaped radiator 100 receives the third frequency signal on the first arc-shaped radiator 100 (not shown in FIG. 4), the frequency modulation component 200 can make the frequency of the first frequency signal change significantly, the frequency of the second frequency signal change slightly, and the frequency of the third frequency signal change slightly.

If the frequency modulation component 200 is connected to the intersection of the weak current area when the first arc-shaped radiator 100 receives the first frequency signal, the strong current area when the first arc-shaped radiator 100 receives the second frequency signal, and the weak current area when the first arc-shaped radiator 100 receives the third frequency signal on the first arc-shaped radiator 100 (area M3 in FIG. 4), the frequency modulation component 200 can make the frequency of the first frequency signal change greatly, the frequency of the second frequency signal change slightly, and the frequency of the third frequency signal change greatly.

If the frequency modulation component 200 is connected to the intersection of the weak current area when the first arc-shaped radiator 100 receives the first frequency signal, the weak current area when the first arc-shaped radiator 100 receives the second frequency signal, and the strong current area when the first arc-shaped radiator 100 receives the third frequency signal on the first arc-shaped radiator 100 (area M2 and area M4 in FIG. 4), the frequency modulation component 200 can make the frequency of the first frequency signal change greatly, the frequency of the second frequency signal change greatly, and the frequency of the third frequency signal change slightly.

If the frequency modulation component 200 is connected to the intersection of the weak current area when the first arc-shaped radiator 100 receives the first frequency signal, the weak current area when the first arc-shaped radiator 100 receives the second frequency signal, and the weak current area when the first arc-shaped radiator 100 receives the third frequency signal on the first arc-shaped radiator 100 (not shown in FIG. 4), the frequency modulation component 200 can make the frequency of the first frequency signal change greatly, the frequency of the second frequency signal change greatly, and the frequency of the third frequency signal change greatly.

By connecting the frequency modulation component 200 to the third preset position on the first arc-shaped radiator 100, the frequencies of the first frequency signal, the second frequency signal, and the third frequency signal can be adjusted, such that the frequency of the first frequency signal is adjusted to the first target frequency, the frequency of the second frequency signal is adjusted to the second target frequency, and the frequency of the third frequency signal is adjusted to the third target frequency. Finally, the antenna structure can receive the first satellite positioning signal of the first target frequency, the second satellite positioning signal of the second target frequency, and the third frequency signal of the third target frequency. Compared with using three radiators to receive three frequency signals, the antenna structure provided in the non-limiting embodiments of the present application can receive the first satellite positioning signal, the second satellite positioning signal, and the third frequency signal by using only the first arc-shaped radiator 100, which can reduce the length of the radiator, reduce the occupied space of the antenna structure, and improve the flexibility in designing the antenna structure in the wearable electronic devices.

It should be noted that only part of the third preset positions are shown in FIG. 4, the first arc-shaped radiator 100 receives the first frequency signal, the second frequency signal, and the third frequency signal with different frequencies, and the first arc-shaped radiator 100 comprises different third preset positions.

Exemplarily, the first satellite positioning signal is an L1 frequency band signal, the second satellite positioning signal is an L5 frequency band signal, and the third frequency signal comprises a WIFI/Bluetooth signal.

Figure 5:
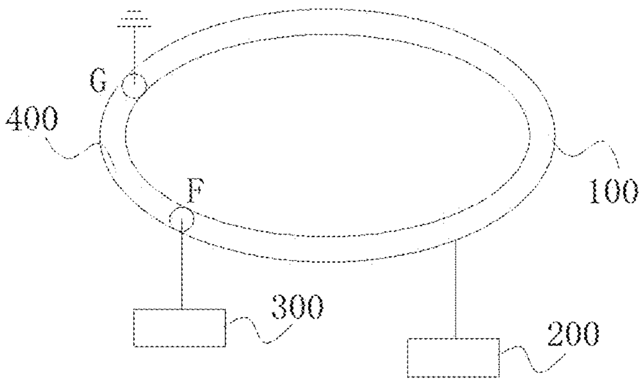
FIG. 5 is a structural schematic diagram of the antenna structure provided by a non-limiting embodiment of the present application.

In some non-limiting embodiments, as shown in FIG. 5, the antenna structure further comprises a second arc-shaped radiator 400, the first arc-shaped radiator 100 and the second arc-shaped radiator 400 form a complete ring structure, and the second arc-shaped radiator 400 is configured to receive a fourth frequency signal.

Specifically, the antenna structure further comprises a second arc-shaped radiator 400, and the first arc-shaped radiator 100 and the second arc-shaped radiator 400 form a complete ring structure. The first arc-shaped radiator 100 can receive a first frequency signal, a second frequency signal, and a third frequency signal. Reference can be made to the above description for the specific principle. The second arc-shaped radiator 400 can receive a fourth frequency signal. In this way, the first arc-shaped radiator 100 and the second arc-shaped radiator 400 form the complete ring structure and can simultaneously receive four frequency signals (the first frequency signal, the second frequency signal, the third frequency signal, and the fourth frequency signal). Compared with the conventional method where four radiators are required to receive four frequency signals, the antenna structure provided in the non-limiting embodiments of the present application only uses one complete ring-shaped radiator to receive four frequency signals, which can greatly reduce the length of the radiator, reduce the occupied space of the antenna structure, and improve the flexibility in designing the antenna structure in the wearable electronic device.

The present application further provides a wearable electronic device, comprising a casing, a position determination component, and the above-mentioned antenna structure, and the position determination component is arranged inside the casing.

Specifically, the antenna structure can receive the first satellite positioning signal and the second satellite positioning signal, and transmit the first satellite positioning signal and the second satellite positioning signal to the position determination component. The position determination component is configured to receive the first satellite positioning signal and the second satellite positioning signal from the antenna structure, and determine a current geographic location based on the first satellite positioning signal and the second satellite positioning signal. Since the antenna structure used in the wearable electronic device of the non-limiting embodiments of the present application features small size and small space occupation, the antenna structure can be flexibly designed in the wearable electronic device, thus reducing the difficulty in designing the antenna structure in the wearable electronic device. Reference can be made to the above description of the antenna structure for the specific working principle, which will not be repeated herein.

The embodiments described above are only used to illustrate, rather than limit, the technical solutions of the present application. Although the present application has been described in detail with reference to the aforementioned embodiments, those skilled in the art should understand that the technical solutions described in the aforementioned embodiments can be further modified, or some of the technical features may be replaced equivalently. However, such modifications or replacements do not deviate the essence of the corresponding technical solutions from the spirit and scope of the technical solutions of the embodiments of the present application, and should fall within the protection scope of the present application.

What is claimed is:

1. An antenna structure, comprising:

a first arc-shaped radiator, having a first end configured to be electrically connected with a position determination component and a second end configured to be grounded, and the first arc-shaped radiator being configured to receive a first frequency signal and a second frequency signal; and a frequency modulation component, being electrically connected with the first arc-shaped radiator and configured to adjust a frequency of the first frequency signal to a first target frequency and a frequency of the second frequency signal to a second target frequency; wherein the first frequency signal comprises a first satellite positioning signal, and the second frequency signal comprises a second satellite positioning signal;

wherein the first satellite positioning signal is an L1 frequency band signal, and the second satellite positioning signal is an L5 frequency band signal.

2. The antenna structure according to claim 1, wherein the frequency modulation component is connected at a first preset position on the first arc-shaped radiator;

the first preset position comprises one or more of the following positions:

an intersection of a strong current area when the first arc-shaped radiator receives the first frequency signal and a weak current area when the first arc-shaped radiator receives the second frequency signal on the first arc-shaped radiator;

an intersection of a weak current area when the first arc-shaped radiator receives the first frequency signal and a strong current area when the first arc-shaped radiator receives the second frequency signal on the first arc-shaped radiator; and an intersection of the weak current area when the first arc-shaped radiator receives the first frequency signal and the weak current area when the first arc-shaped radiator receives the second frequency signal on the first arc-shaped radiator.

3. The antenna structure according to claim 2, wherein the frequency modulation component comprises a capacitor and/or an inductor;

when the frequency modulation component comprises the capacitor, a first end of the capacitor is connected to the first preset position on the first arc-shaped radiator, and a second end of the capacitor is configured to be grounded; and when the frequency modulation component comprises the inductor, a first end of the inductor is connected to the first preset position on the first arc-shaped radiator, and a second end of the inductor is configured to be grounded.

4. The antenna structure according to claim 1, wherein the frequency modulation component is connected to a second preset position of the first arc-shaped radiator; and the second preset position comprises a midpoint position of the first arc-shaped radiator, and/or, the second preset position comprises a position of at least one point of two trisection points of the first arc-shaped radiator.

5. The antenna structure according to claim 1, wherein the first arc-shaped radiator is further configured to receive a third frequency signal, and the frequency modulation component is further configured to adjust the frequency of the third frequency signal to a third target frequency.

6. The antenna structure according to claim 1, wherein the frequency modulation component is connected to a third preset position on the first arc-shaped radiator; and the third preset position comprises one or more of the following positions:

an intersection of a strong current area when the first arc-shaped radiator receives the first frequency signal, a strong current area when the first arc-shaped radiator receives the second frequency signal, and a weak current area when the first arc-shaped radiator receives the third frequency signal on the first arc-shaped radiator;

an intersection of the strong current area when the first arc-shaped radiator receives the first frequency signal, a weak current area when the first arc-shaped radiator receives the second frequency signal, and a strong current area when the first arc-shaped radiator receives the third frequency signal on the first arc-shaped radiator;

an intersection of the strong current area when the first arc-shaped radiator receives the first frequency signal, the weak current area when the first arc-shaped radiator receives the second frequency signal, and the weak current area when the first arc-shaped radiator receives the third frequency signal on the first arc-shaped radiator;

an intersection of a weak current area when the first arc-shaped radiator receives the first frequency signal, the strong current area when the first arc-shaped radiator receives the second frequency signal, and the strong current area when the first arc-shaped radiator receives the third frequency signal on the first arc-shaped radiator;

an intersection of the weak current area when the first arc-shaped radiator receives the first frequency signal, the strong current area when the first arc-shaped radiator receives the second frequency signal, and the weak current area when the first arc-shaped radiator receives the third frequency signal on the first arc-shaped radiator;

an intersection of the weak current area when the first arc-shaped radiator receives the first frequency signal, the weak current area when the first arc-shaped radiator receives the second frequency signal, and the strong current area when the first arc-shaped radiator receives the third frequency signal on the first arc-shaped radiator; and an intersection of the weak current area when the first arc-shaped radiator receives the first frequency signal, the weak current area when the first arc-shaped radiator receives the second frequency signal, and the weak current area when the first arc-shaped radiator receives the third frequency signal on the first arc-shaped radiator.

7. The antenna structure according to claim 1, wherein the third frequency signal comprises a WIFI/Bluetooth signal.

8. The antenna structure according to claim 1, wherein the antenna structure further comprises a second arc-shaped radiator, the first arc-shaped radiator and the second arc-shaped radiator form a complete ring structure, and the second arc-shaped radiator is configured to receive a fourth frequency signal.

9. A wearable electronic device, comprising:

a casing, the antenna structure according to claim 1, and a position determination component, which is arranged inside the casing, and configured to: receive the first satellite positioning signal and the second satellite positioning signal from the antenna structure, and determine a current geographic location based on the first satellite positioning signal and the second satellite positioning signal.

10. The wearable electronic device according to claim 9, wherein the frequency modulation component is connected at a first preset position on the first arc-shaped radiator;

the first preset position comprises one or more of the following positions:

an intersection of a strong current area when the first arc-shaped radiator receives the first frequency signal and a weak current area when the first arc-shaped radiator receives the second frequency signal on the first arc-shaped radiator;

an intersection of a weak current area when the first arc-shaped radiator receives the first frequency signal and a strong current area when the first arc-shaped radiator receives the second frequency signal on the first arc-shaped radiator; and an intersection of the weak current area when the first arc-shaped radiator receives the first frequency signal and the weak current area when the first arc-shaped radiator receives the second frequency signal on the first arc-shaped radiator.

11. The wearable electronic device according to claim 10, wherein the frequency modulation component comprises a capacitor and/or an inductor;

when the frequency modulation component comprises the capacitor, a first end of the capacitor is connected to the first preset position on the first arc-shaped radiator, and a second end of the capacitor is configured to be grounded; and when the frequency modulation component comprises the inductor, a first end of the inductor is connected to the first preset position on the first arc-shaped radiator, and a second end of the inductor is configured to be grounded.

12. The wearable electronic device according to claim 9, wherein the frequency modulation component is connected to a second preset position of the first arc-shaped radiator; and the second preset position comprises a midpoint position of the first arc-shaped radiator, and/or, the second preset position comprises a position of at least one point of two trisection points of the first arc-shaped radiator.

13. The wearable electronic device according to claim 9, wherein the first satellite positioning signal is an L1 frequency band signal, and the second satellite positioning signal is an L5 frequency band signal.

14. The wearable electronic device according to claim 9, wherein the first arc-shaped radiator is further configured to receive a third frequency signal, and the frequency modulation component is further configured to adjust the frequency of the third frequency signal to a third target frequency.

15. The wearable electronic device according to claim 14, wherein the frequency modulation component is connected to a third preset position on the first arc-shaped radiator; and the third preset position comprises one or more of the following positions:

an intersection of a strong current area when the first arc-shaped radiator receives the first frequency signal, a strong current area when the first arc-shaped radiator receives the second frequency signal, and a weak current area when the first arc-shaped radiator receives the third frequency signal on the first arc-shaped radiator;

an intersection of the strong current area when the first arc-shaped radiator receives the first frequency signal, a weak current area when the first arc-shaped radiator receives the second frequency signal, and a strong current area when the first arc-shaped radiator receives the third frequency signal on the first arc-shaped radiator;

an intersection of the strong current area when the first arc-shaped radiator receives the first frequency signal, the weak current area when the first arc-shaped radiator receives the second frequency signal, and the weak current area when the first arc-shaped radiator receives the third frequency signal on the first arc-shaped radiator;

an intersection of a weak current area when the first arc-shaped radiator receives the first frequency signal, the strong current area when the first arc-shaped radiator receives the second frequency signal, and the strong current area when the first arc-shaped radiator receives the third frequency signal on the first arc-shaped radiator;

an intersection of the weak current area when the first arc-shaped radiator receives the first frequency signal, the strong current area when the first arc-shaped radiator receives the second frequency signal, and the weak current area when the first arc-shaped radiator receives the third frequency signal on the first arc-shaped radiator;

an intersection of the weak current area when the first arc-shaped radiator receives the first frequency signal, the weak current area when the first arc-shaped radiator receives the second frequency signal, and the strong current area when the first arc-shaped radiator receives the third frequency signal on the first arc-shaped radiator; and an intersection of the weak current area when the first arc-shaped radiator receives the first frequency signal, the weak current area when the first arc-shaped radiator receives the second frequency signal, and the weak current area when the first arc-shaped radiator receives the third frequency signal on the first arc-shaped radiator.

* * * * *